United States Patent
Kitagawara

Patent Number: 5,269,195
Date of Patent: Dec. 14, 1993

[54] VEHICLE PARK LOCK MECHANISM

[75] Inventor: Hiroshi Kitagawara, Kobe, Japan

[73] Assignee: Kanzaki Kokyukoki Mfg. Co., Ltd., Japan

[21] Appl. No.: 917,340

[22] Filed: Jul. 23, 1992

[30] Foreign Application Priority Data

Oct. 22, 1991 [JP] Japan .................. 3-94537[U]

[51] Int. Cl.⁵ .................. F16D 49/00; G05G 5/18
[52] U.S. Cl. .................. 74/411.5; 74/577 M; 74/577 S; 192/4 A; 188/69
[58] Field of Search .......... 74/411.5, 530, 577 S, 74/577 M; 192/4 A; 188/31, 69

[56] References Cited

U.S. PATENT DOCUMENTS

| | | | |
|---|---|---|---|
| 3,187,846 | 6/1965 | Powell | 188/69 |
| 3,601,231 | 8/1971 | Kolacz et al. | 188/69 |
| 3,990,541 | 11/1976 | Dobrinska et al. | 192/4 A X |
| 4,029,267 | 6/1977 | Slipper | 74/577 M X |
| 4,089,394 | 5/1978 | Haupt et al. | 192/4 A |
| 4,157,745 | 6/1979 | Nelson | 188/69 X |
| 4,310,081 | 1/1982 | Kolacz | 192/4 A |
| 4,413,712 | 11/1983 | Richard | 192/4 A |
| 4,823,633 | 4/1989 | Pike | 74/411.5 |

FOREIGN PATENT DOCUMENTS 56-21261 2/1981 Japan.

*Primary Examiner*—Rodney H. Bonck
*Assistant Examiner*—David W. Laub

[57] ABSTRACT

In a vehicle park lock mechanism having a rotatable lock arm (5) for locking a gear (3) which is fixedly mounted on a transmission shaft (2), a pawl device integral with the lock arm is comprised of first and second locking pawls (6F, 6R) which are operable to engage the gear so as to prevent forward and backward directional rotations of the gear. The first and second pawls are arranged such that they may project into one and another toothe spaces (3b) of the gear which are spaced circumferentially of the gear with at least one tooth space therebetween. Gear having a relatively large pressure angle such as a transmission gear may satisfactorily be used as the gear for the lock mechanism.

2 Claims, 7 Drawing Sheets

VEHICLE PARK LOCK MECHANISM

FIELD OF THE INVENTION

This invention relates to a vehicle park lock mechanism for keeping a vehicle from running when it is parked. More particularly, the present invention relates to a park lock mechanism comprising a gear fixedly mounted on a transmission shaft, which is given selectively a forward directional rotation for providing a forward directional run of the vehicle and a backward directional rotation for providing a backward directional run of the vehicle, and a rotatable lock arm which includes thereon an integral pawl means engageable with the gear and is operated to rotate towards a direction of causing an engagement of the pawl means with the gear.

BACKGROUND OF THE INVENTION

In a park lock mechanism of the type set forth above according to the prior art, the pawl means on a rotatable lock arm is composed generally of a single locking pawl and a particular gear other than power transmission gears is generally employed as the gear for the park lock mechanism. Such particular gear is employed for the purpose of eliminating the necessity of providing a large rigidity for an operating system of the lock arm. That is, the single locking pawl is projected into a tooth space of the gear and prevents a forward directional rotation of the gear by an engagement of its one side surface with one of the tooth surfaces of the gear at one side of the tooth space and a backward directional rotation of the gear by an engagement of its the other side surface with the other tooth surface at the other side of the tooth space. A large force is applied to the one side surface of pawl by the one tooth surface of gear or to the other side surface of pawl by the other tooth surface of gear particularly when the vehicle is parked at a slope, so that a large torque or rotational moment is applied to the lock arm by the gear in a direction of causing a lock-releasing rotation of the arm. From this, the operating system of the lock arm must have a rigidity large enough to keep an engaged condition of the locking pawl with the gear. Because the torque or rotational moment applied to the lock arm by the gear is increased with the increase in pressure angle of the gear, a transmission gear which is designed to have a large pressure angle for heightening its strength will apply a large torque or rotational moment to the rotatable lock arm so that a particular gear of a small pressure angle is employed as the one for the park lock mechanism.

However, even when a gear of a small pressure angle is employed in a park lock mechanism, such torque or rotational moment is not necessarily small depending on the location of rotational axis of the lock arm and the like. Further, it is often true that different amounts of torque or rotational moment are caused in a vehicle between the two cases where the vehicle tending to run spontaneously into a forward direction is kept from starting and where the vehicle tending to run spontaneously into a backward direction is kept from starting. From this, a prior art mechanism is known, as shown in JP, U No. 56-21261, in which there is employed a particularly profiled gear having tooth surfaces of different pressure angles at the upstream side of forward directional rotation of the gear and at the upstream side of backward directional rotation of the gear so that torque or rotational moment applied to the operating system for the rotatable lock arm will be equalized at the two cases set forth above so as to lighten the burden to the operating system.

However, such gear having tooth surfaces of one and the other rotational sides of different pressure angles requires particularly shaped gear-cutting and gear-finishing tools so that it is very expensive to manufacture. The structure that gear of a small pressure angle other than transmission gears is employed in a park lock mechanism is not preferred in view of cost required for parts and assembling of a vehicle transmission and also in view of space required for the transmission.

Accordingly, a primary object of the present invention is to provide a novel park lock mechanism which permits the employment of a gear having a relatively large pressure angle, such as a transmission gear, without the need of reinforcement of the lock-actuating system.

BRIEF DESCRIPTION OF THE DRAWINGS

Other objects and advantages of the invention will become readily apparent as the specification is considered in conjunction with the accompanying drawings in which.

SUMMARY OF THE INVENTION

Figure 1:
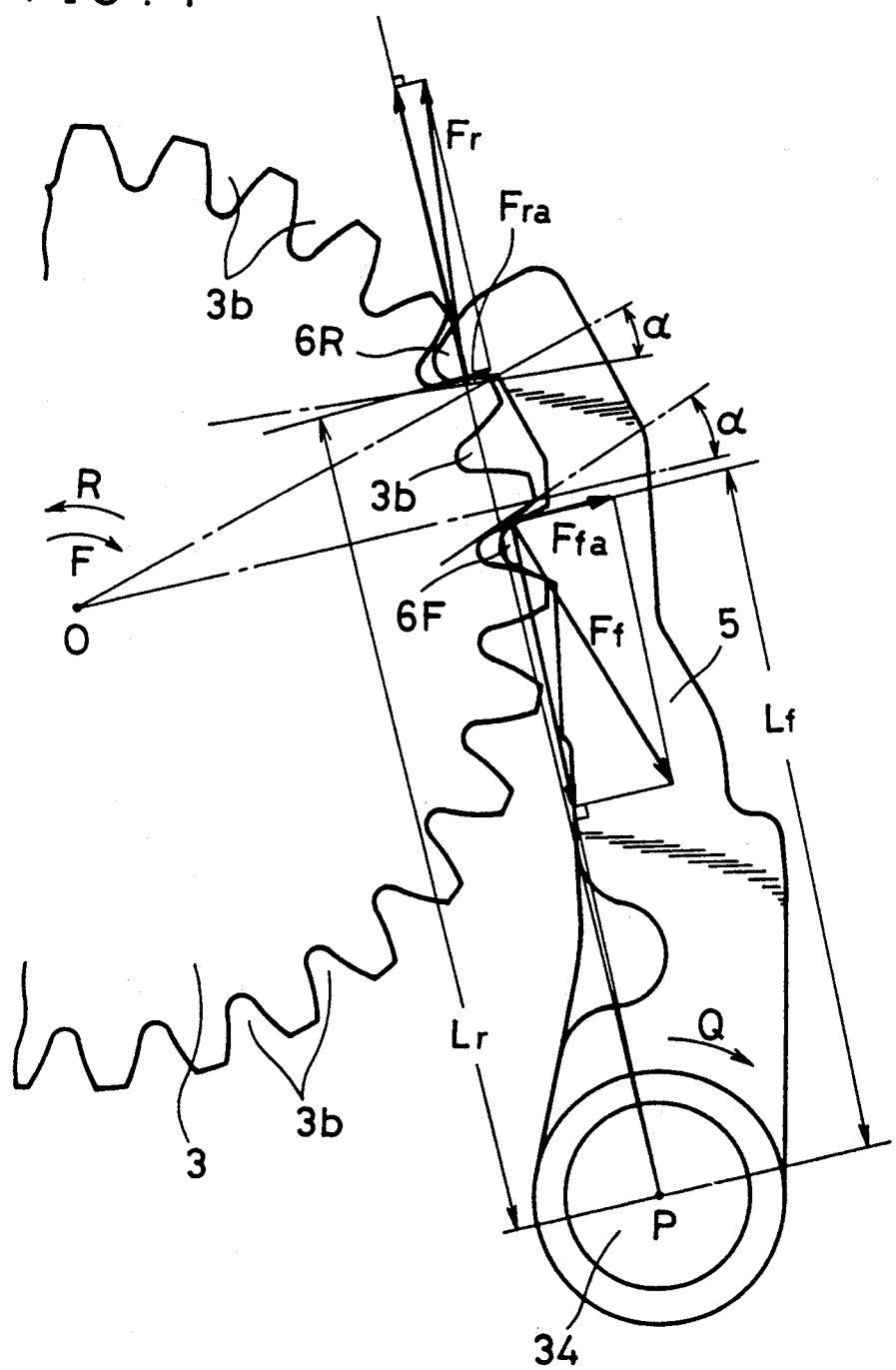
FIG. 1 is an enlarged rear view, partially omitted, of a part of an embodiment of the park lock mechanism according to the present invention.

The present invention relates to a vehicle park lock mechanism 1 which comprises, as shown in FIGS. 1 to 4, a gear 3 fixedly mounted on a transmission shaft 2, which is given selectively a forward directional rotation for providing a forward directional run of the vehicle and a backward directional rotation for providing a backward directional run of the vehicle, and a rotatable lock arm 5 which includes thereon an integral pawl means engageable with the gear 3 and is operated to rotate towards a direction of causing an engagement of the pawl means with the gear 3.

According to the present invention, the pawl means is comprised of first and second locking pawls 6F and 6R. As clearly shown in FIG. 1, these two pawls 6F and 6R are arranged such that when the lock arm 5 is rotated towards gear 3 they may project into two tooth spaces 3b of the gear which are spaced from each other circumferentially of the gear with at least one tooth space therebetween. The first locking pawl 6F is fashioned to be operable to engage a tooth surface of gear 3 so as to prevent the forward directional rotation of the gear, while the second locking pawl 6R is fashioned to be operable to engage a tooth surface of gear 3 so as to prevent the backward directional rotation of the gear.

Figure 4:
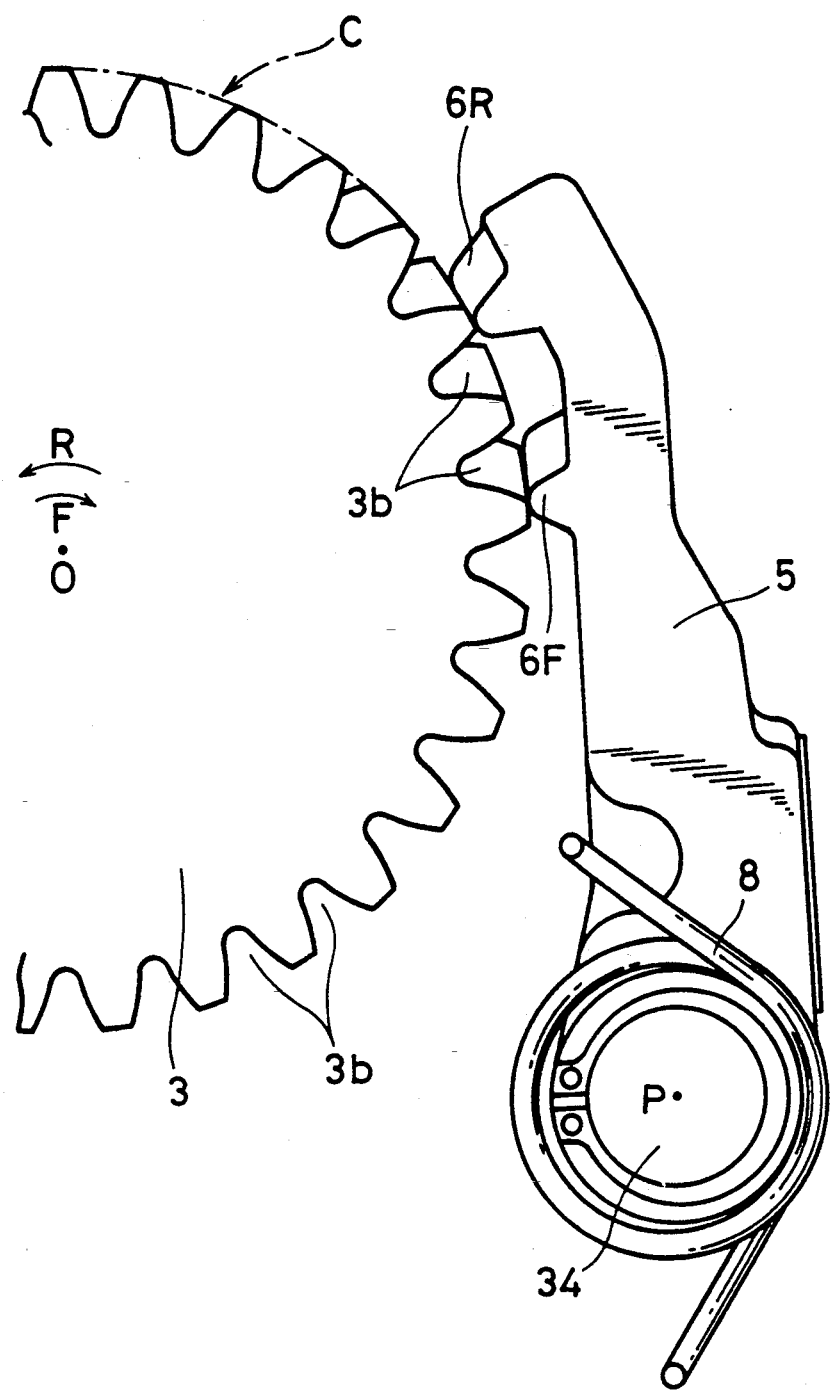
FIG. 4 is an enlarged rear view, partially omitted, of the part shown in FIG. 1 and showing a state different from that shown in FIG. 1.

In a preferred embodiment of the present invention, the lock arm 5 having thereon integral pawls 6F and 6R is shaped, as clearly shown in FIG. 4, such that crests of the two locking pawls 6F and 6R are positioned on the addendum circle (C) of the gear 3 at a same time.

Figure 5:
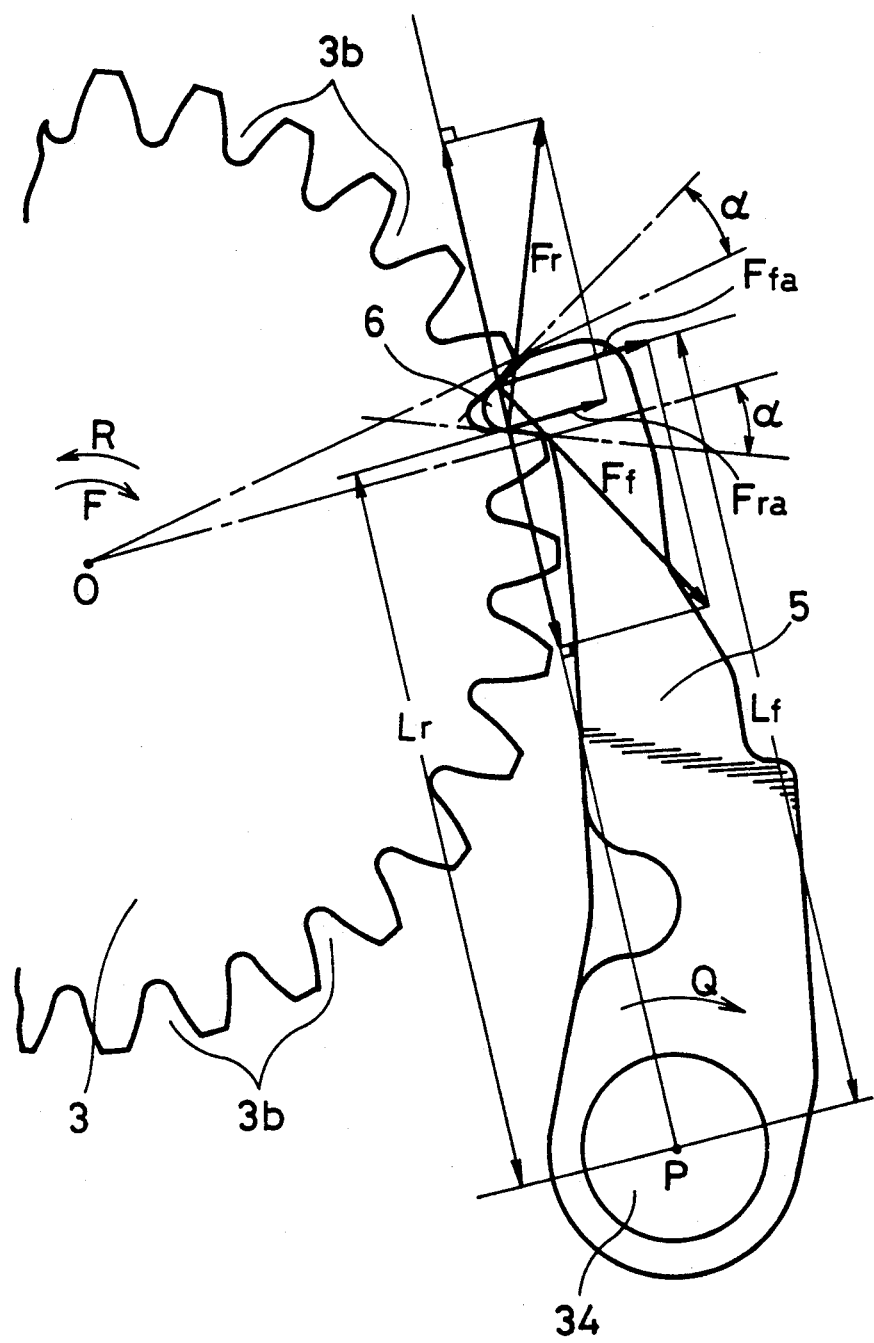
FIG. 5 is an enlarged rear view similar to FIG. 1 but showing a part of a park lock mechanism having a single locking pawl on a lock arm.

The operation of the park lock mechanism according to the present invention will be analyzed hereinafter in comparison with that of a mechanism comprising a single locking pawl. In each of FIGS. 1 and 5, gear 3 having a same pressure angle α is shown. FIG. 1 illustrates a state where the two locking pawls 6F and 6R set forth above are in engagement with the gear 3, whereas FIG. 5 illustrates a state where a single locking pawl 6 on a lock arm 5 is in engagement with the gear 3. Center of the gear 3 is designated by character 0, and rotational center or axis of the lock arm 5 is designated by character P. Arrow F represents the forward directional rotation of gear 3, whereas arrow R represents the backward directional rotation of gear 3. In the mechanism shown in FIG. 1, the first pawl 6F is disposed on the lock arm 5 such that it takes a position nearer to the rotational axis P than the second pawl 6R. Though the two locking pawls 6F, 6R shown are adapted to project into two tooth spaces 3b with one tooth space 3b therebetween, such two pawls may also be adapted to project into two tooth spaces with two or three tooth spaces therebetween when a gear having a small pitch and, therefore, a large number of teeth is employed.

In case of FIG. 1, the first locking pawl 6F will prevent a forward directional start of vehicle by its engagement with a tooth surface located at the forward directionally upstream side of the tooth space 3b into which the pawl 6F has projected, while the second locking pawl 6R will prevent a backward directional start of vehicle by its engagement with a tooth surface located at the backward directionally upstream side of the tooth space 3b into which the pawl 6R has projected. In case of FIG. 5, the single locking pawl 6 will prevent a forward directional start of vehicle by its engagement with a gear surface located at the forward directionally upstream side of the tooth space 3b, into which the pawl 6 has projected, and will prevent a backward directional start of vehicle by its engagement with a gear surface at the backward directionally upstream side of the same tooth space 3b. When gear 3 shown in FIG. 1 or in FIG. 5 tends to rotate forward directionally, force Ff shown is applied to the first pawl 6F or to the single pawl 6 by the gear at the point of engagement between the corresponding gear surface and pawl side surface. When gear 3 shown in FIG. 1 or in FIG. 5 tends to rotate backward directionally, force Fr shown is applied to the second pawl 6R or to the single pawl 6 by the gear at the point of engagement between the corresponding gear surface and pawl side surface. Each of these forces Ff and Fr is normal to the common tangent to the corresponding gear surface and pawl side surface and may be divided, as shown in FIGS. 1 and 5, into a component lying on a line connecting the above-mentioned point of engagement and rotational center P of the lock arm 5 and another component Ffa, Fra normal to such line. Each of the latter components Ffa, Fra will generate a moment which forces the lock arm 5 to rotate about the rotational center P towards the direction of releasing the gear lock, as depicted by arrow Q. When length of the moment arm for each component Ffa, Fra is represented by Lf, Lr as shown, the respective rotational moments applied to the lock arm 5 are expressed respectively by Ffa.Lf and by Fra.Lr.

As can be seen from the comparison of FIG. 1 and FIG. 5, each of the components of force Ffa and Fra is much smaller in the case of FIG. 1 than in the case of FIG. 5. The length of moment arm Lf is slightly smaller in the case of FIG. 1 than in the case of FIG. 5, while the length of moment arm Lr is somewhat larger in the case of FIG. 1 than in the case of FIG. 5. The small values of Ffa and Fra in the case of FIG. 1 contribute largely to reduce the moments Ffa.Lf and Fra.Lr so that the respective moments Ffa.Lf and Fra.Lr are much smaller in the case of FIG. 1 than in the case of FIG. 5. Such reduction in the rotational moments applied to the lock arm 5 is based on the separately formed two locking pawls 6F and 6R which prevent the forward directional rotation and backward directional rotation of gear 3 respectively at two locations spaced pretty largely as viewed in the circumferential direction of gear 3. That is, inclinations of the respective tooth surfaces of gear 3 relative to the rotational path of a point on the lock arm 5 (an arch of a circle having its center at the rotational center P) are different from one another in response to the phases of respective tooth surfaces of the gear 3. The two locking pawls 6F and 6R spaced from each other circumferentially of the gear 3 may be adapted such that each of them will engage one of the tooth surfaces having a relative inclination which enables the line of action of each force Ff, Fr applied by the gear 3 to be approached towards the line connecting between the rotational center P of lock arm 5 and the point of action of each force Fr, Fr (point of engagement between each pawl 6F, 6R and gear 3). By this, forces Ff and Fr and, therefore, moments applied to the lock arm 5 by gear 3 may be reduced.

Figure 6:
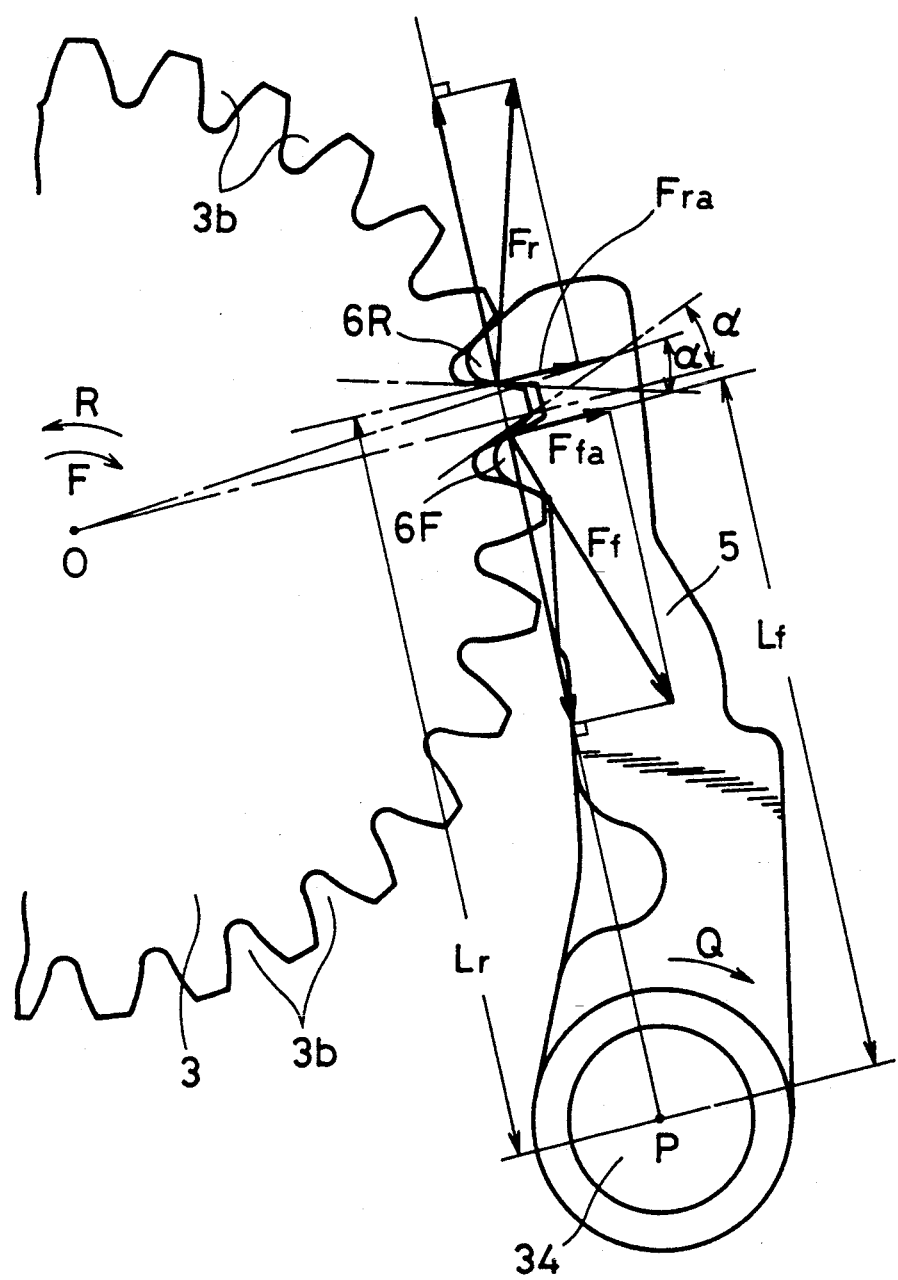
FIG. 6 is an enlarged rear view similar to FIG. 1 but showing a part of a park lock mechanism having two locking pawls which are adapted to engage two adjacent tooth surfaces of a gear tooth, respectively.

This effect is enhanced by the arrangement of two locking pawls 6F and 6R according to the present invention that these two pawls are adapted to project into two tooth spaces 3b which are spaced from each other circumferentially of the gear 3 with at least one tooth space 3b between them, as shown in FIG. 1. In FIG. 6, a lock arm 5 is shown having two locking pawls 6F and 6R which are adapted to project into two adjacent tooth spaces 3b so as to engage one and the other tooth surfaces of a gear tooth. Similarly to FIGS. 1 and 5, forces Ff, Fr and their components Ffa, Fra tending to cause a lock-releasing rotation of the arm 5 are depicted. As can be seen from this FIG. 6, one of the components of force Fra still remains large although length of the corresponding moment arm Lr is smaller than that shown in FIG. 1. The corresponding rotational moment Fra.Lr is much larger in the case of FIG. 6 than in the case of FIG. 1.

Figure 7:
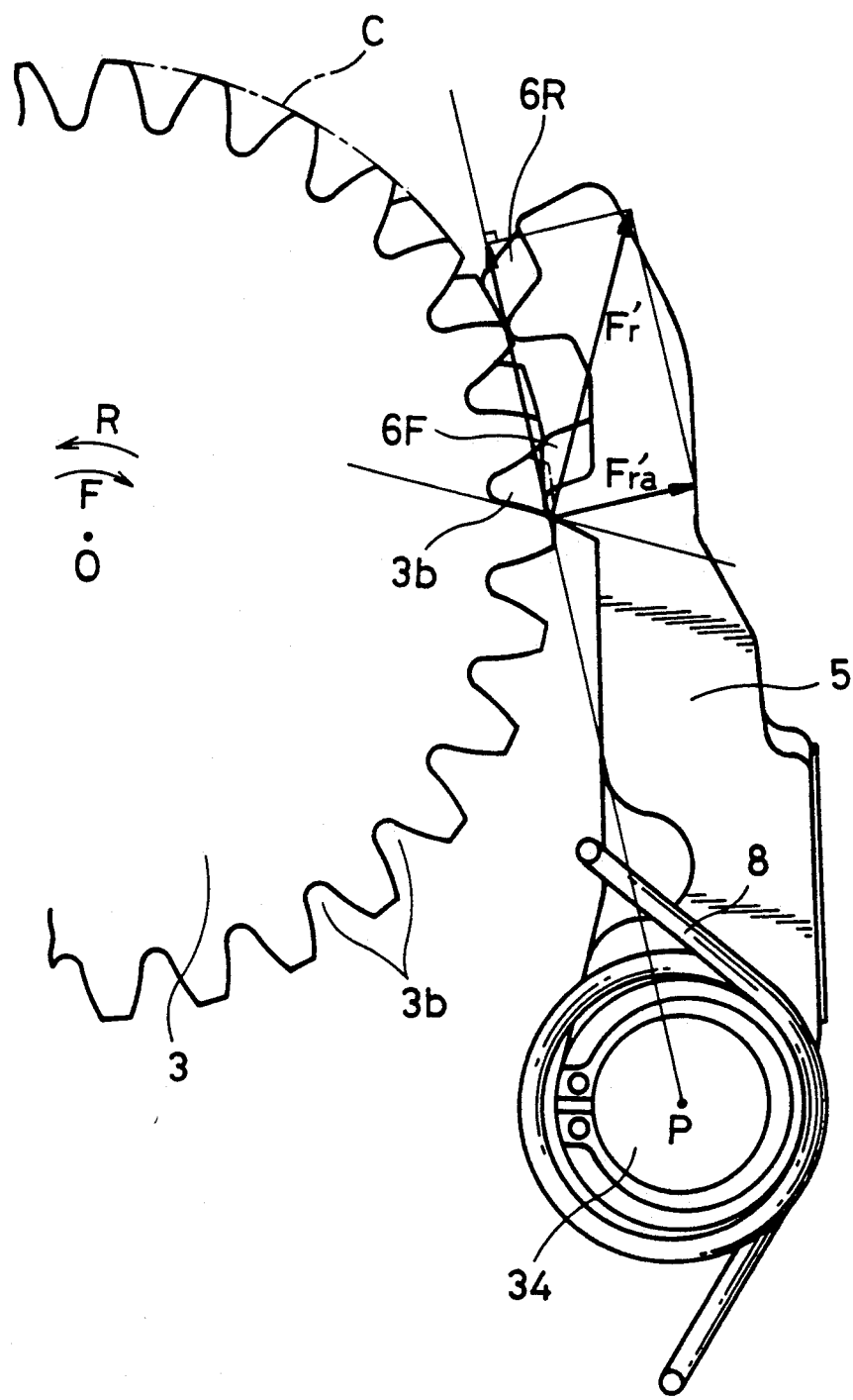
FIG. 7 is an enlarged rear view similar to FIG. 4 but showing a part of a park lock mechanism in which crests of two locking pawls on a lock arm are positioned on the addendum circle of a gear at different times.

According to the aforementioned arrangement of locking pawls 6F and 6R on the lock arm 5 shown in FIG. 4, both of the pawls 6F and 6R come, when the arm 5 is rotated towards the direction of locking the gear 3, in contact with two tooth crests of the gear at a same time, as shown in FIG. 4, or project into two tooth spaces 3b of the gear at a same time without causing any contact with tooth crests of the gear. Contrary to this, when a discrepancy exists between the two pawls 6F and 6R radially of the gear 3 such that, when the crest of one of the pawls 6R is positioned on the addendum circle C of the gear 3, the crest of the other pawl 6F is positioned, as shown in FIG. 7, at an inside of the addendum circle C, a state shown in FIG. 7 may occur in which, while the former pawl 6R is in contact at its crest with a crest of the gear 3, a crest portion of the latter pawl 6F is in a tooth space 3b of the gear and is in engagement with a tooth surface which is opposite to the tooth surface to be engaged by the pawl 6F. The surface portion at which the pawl 6F is in engagement with gear 3 at the state shown in FIG. 7 is located near a crest of the gear and has a large inclination.

When the state shown in FIG. 7 has occurred during a lock-actuating operation, friction between the locking pawl 6F and tooth surface engaged thereby will cause a delay in the rotational displacement of lock arm 5 so that stopping of the vehicle is delayed particularly at a descent and wearing of the locking pawls is caused. Further, there is a possibility that the vehicle is locked at the condition, shown in FIG. 7, of the park lock mechanism. In such case, the locking pawl 6F engaging a tooth surface portion of a large inclination may cause a large force F'r or its component F'ra shown towards the lock-releasing direction so that load applied to the operating system for lock arm 5 is possibly enlarged. In the arrangement of pawls 6F and 6R on the lock arm 5 shown in FIG. 4, the locking pawls 6F and 6R may once be in contact with two tooth crests of the gear at the addendum circle C, as shown, but will then project, when the gear is rotationally displaced by some degree from the condition shown in FIG. 4, into two tooth spaces 3b at a same time so that problems set forth above by referring to FIG. 7 are well avoided.

DESCRIPTION OF A PREFERRED EMBODIMENT

Figure 2:
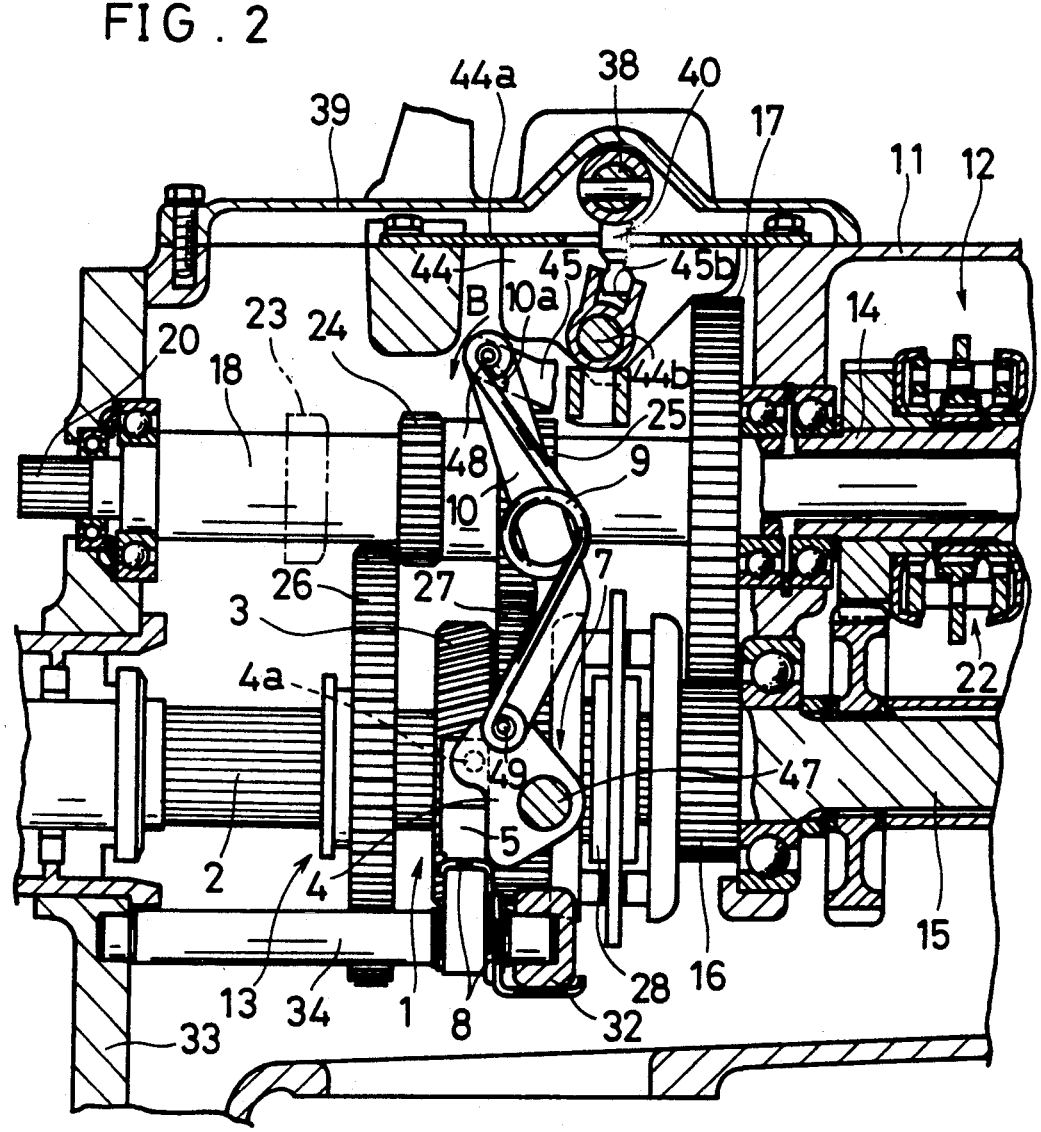
FIG. 2 is a sectional side view, partially developed, showing a part of a tractor in which the embodiment set forth above is employed.
Figure 3:
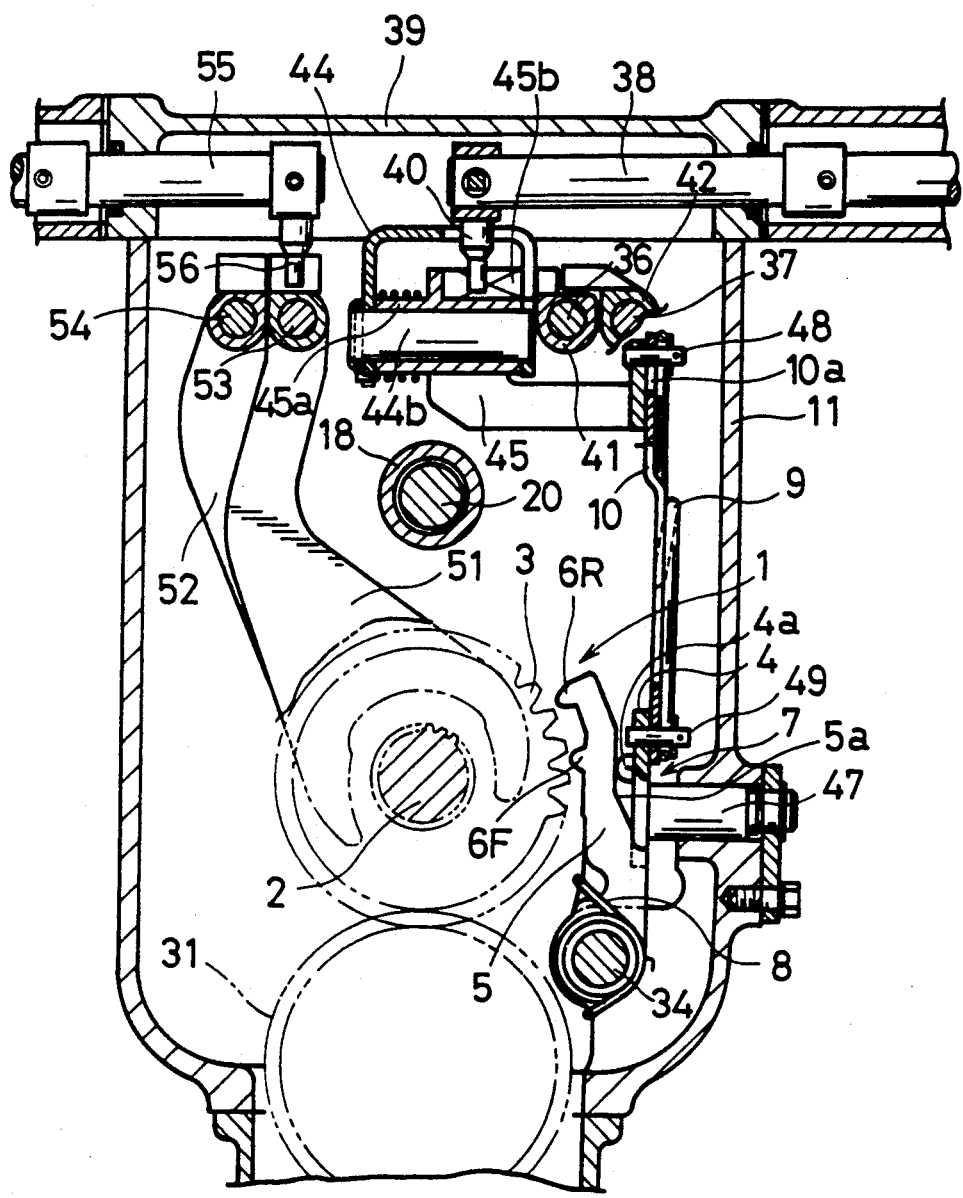
FIG. 3 is a sectional rear view, partially omitted, of the tractor shown in FIG. 2.

FIGS. 1 to 4 depict an embodiment of the present invention which is employed in a tractor comprising a transmission case 11 shown in FIGS. 2 and 3. Propeller shaft 2 which is disposed at a low level within a rear half of the transmission case 11 is used as the aforementioned transmission shaft for fixedly mounting the aforementioned gear 3 of the park lock mechanism 1. As gear 3, a transmission gear for taking-off front wheel (not shown) driving power from the propeller shaft 2 is used.

As shown in FIG. 2, a main speed change mechanism 12 (only a part of it is shown) and an auxiliary speed change mechanism 13 are disposed within the transmission case 11 and are connected in series with each other. The main speed change mechanism 12 is disposed between a hollow drive shaft 14 and a speed-change shaft 15 which is arranged below the drive shaft, whereas the auxiliary speed change mechanism 13 is disposed between a hollow intermediate shaft 18, which is arranged co-axially with and behind the drive shaft 14 and is co-rotatably connected to the change shaft 15 through meshing gears 16 and 17, and the propeller shaft 2 which is arranged co-axially with and behind the change shaft 15. A transmission shaft 20 extends through the hollow drive and intermediate shafts 14 and 18 and transmits power to a rear-PTO shaft (not shown) for driving an auxiliary implement to be drawn by the tractor.

The main speed change mechanism 12 comprises four speed-change gear trains, only one of which is shown in FIG. 2, disposed between the drive and change shafts 14 and 15 and is fashioned to perform three-stage forward directional change transmissions and one-stage backward directional change transmission by coupling respective change gears, rotatably mounted on the drive shaft 14, selectively to this shaft using two double-acting synchronizer clutches 22 only one of which is shown in FIG. 2. The auxiliary speed change mechanism 13 comprises a creeping gear 23 which is driven to rotate by the intermediate shaft 18 through a reduction gear train (not shown), two change gears 24 and 25 which are fixedly mounted on the intermediate shaft 18, a shift gear 26 which is mounted slidably but non-rotatably on the propeller shaft 2 and may be meshed selectively with gears 23 and 24 on the intermediate shaft 18, a gear 27 which is rotatably mounted on the propeller shaft 2 and meshes with gear 25 on the intermediate shaft 18, and a movable clutch member 28 which is slidingly displaced on the propeller shaft selectively to a position, where it couples the gear 27 to this shaft, and to another position where it couples the shaft 2 directly to the change shaft 15. Consequently, the auxiliary speed change mechanism 13 shown is fashioned to perform four-stage change transmissions.

As shown in FIGS. 2 and 3, gear 3 is fixedly mounted on the propeller shaft 2 and meshes with an intermediate gear 31 for taking-off front wheel-driving power. The aforementioned lock arm 5 is supported rotatably so as to be engageable with the gear by a support shaft 34 which extends axially of the tractor and is supported at its respective ends by a support wall 32 on an inner surface of the transmission case 11 and by a front wall of a rear case 33 which is attached to the rear of transmission case 11. This lock arm 5 is biased to rotate towards a direction of causing disengagement from the gear 3 by a return spring 8 comprised of a torque spring which is wound around the support shaft 34 and engages at its ends with the support wall 32 and with the lock arm 5.

In the illustrative embodiment shown, an operating mechanism for the rotatable lock arm 5 of the park lock mechanism 1 is constructed using a control mechanism for the main speed change mechanism 12. As shown in FIG. 3, two fork-carrying shafts 36 and 37 extending axially of the tractor are slidably disposed at one side of an uppermost portion within the transmission case 11 and carry two shifter forks (not shown) which are disposed within a front half of the transmission case for operating the aforementioned two double-acting synchronizer clutches 22 (FIG. 2). A control shaft 38 which is operated selectively by a main change lever (not shown) to slide and also to rotate extends laterally of the tractor and carries a shifter pin 40 at an inside of a top cover 39 for the transmission case 11. Sleeve members 41 and 42 are fixedly mounted on the fork-carrying shafts 36 and 37 and have in their upper surfaces engaging grooves into which the shifter pin 40 may project by a selective sliding displacement of the control shaft 38. In operating the main speed change mechanism 12, the control shaft 38 is firstly given a sliding displacement so that pin 40 will enter the engaging groove of one of the sleeve members 41 and 42. Then, the control shaft is given a rotational displacement so as to slidingly displace one of the sleeve members 41, 42 and fork-carrying shafts 36, 37 through the shifter pin 40. As shown in FIGS. 2 and 3, a support frame 44 is secured at its uppermost attaching plate portion 44a to an upper surface of the transmission case and depends into the case 11. This support frame has a support shaft 44b, secured thereto, on which an operating arm 45 is rotatably mounted at its base end tubular portion 45a. This arm 45 extends sidewards below the fork-carrying shafts 36 and 37 and is adapted to operate, when it is rotated about the support shaft 44b, the lock arm 5 to rotate towards gear 3, as will be detailed later. The operating arm 45 includes at its base end portion an engaging groove 45b which is aligned laterally of the transmission case 11 with the engaging grooves of sleeve members 41 and 42. The shifter pin 40 is adapted to project into the groove 45b at a neutral condition of the main speed change mechanism 12, as shown in FIGS. 2 and 3. When the control shaft 38 is rotationally displaced from this condition, the operating arm 45 is rotated about shaft 44b.

In the illustrative embodiment shown, a cam mechanism 7 shown in FIGS. 2 and 3 is provided for rotating the lock arm 5 towards the gear 3. This mechanism 7 includes a cam plate 4 attached to an inner end of a rotatable support shaft 47 which extends through a sidewall of the transmission case 11 and is supported rotatably about its axis by the sidewall. The lock arm 5 includes at a side opposite to the locking pawls 6F, 6R a cam surface 5a which engages under the biasing force of return spring 8 applied to arm 5 with a cam projection 4a on the cam plate 4. The cam surface 5a is shaped such that, when the cam plate 4 is rotated together with shaft 47 counterclockwise, as viewed in FIG. 2, to cause a downward displacement of the cam projection 4a, lock arm 5 is rotated about the support shaft 34 towards the gear 3.

As also shown in FIGS. 2 and 3, the operating arm 45 is operatively connected to the cam plate 4 using a helical spring 9 and a link member 10 which are arranged parallel to each other. Of these connecting members, the helical spring 9 is hooked at its both ends over pins 48 and 49 which are attached to respective free end portions of arm 45 and plate 4 and are parallel to each other. The link member 10 includes at its upper end portion an elongated bore 10a through which the pin 48 on the operating arm 45 extends. Lower end of the link member 10 is connected to the cam plate 4 using the pin 49 on this plate. The helical spring 9 is bend-shaped such that its spring force is heightened when it is compressed by a rotational displacement of the operating arm 45 towards a direction of arrow B shown in FIG. 2. Link member 10 is also bend-shaped such that it extends along the helical spring so as to avoid an interference of these connecting members 9 and 10 with other members within the transmission case. The elongated bore 10a is disposed and sized such that, when the operating arm 45 is rotationally displaced along arrow B shown in FIG. 2 so as to actuate the park lock mechanism 1, pin 48 moves freely in and along the bore 10a so that no rotational displacement is given to the link member 10. Consequently, lock-actuating rotational displacement of the operating arm 45 is transmitted to the cam plate 4 exclusively by the helical spring 9. When locking pawls 6F and 6R on the lock arm 5 have come in contact with crests of the gear 3, as illustrated in FIG. 4, during a lock-actuating operation, spring 9 continues to force the lock arm 5 by its spring force stored due to compression thereof and, then, will cause a further rotational displacement of the arm 5 whereby the pawls 6F and 6R will project into tooth spaces 3b of the gear 3. The helical spring 9 is further fashioned such that it forces the lock arm 5 still at the lock-actuated condition shown in FIG. 1 against a rotational moment applied by the gear and against the biasing force of return spring 8 so as to keep the lock-actuated condition. During a lock-releasing operation which is carried out by giving a rotational displacement to the operating arm 45 towards the reverse direction of arrow B shown in FIG. 2, the cam plate 4 is rotationally displaced through the link member 10 as from the time when pin 48 on the arm 45 has come in engagement with link member 10 at one end of the elongated bore 10a. By this, lock arm 5 is rotationally displaced away from the gear 3 by the biasing force of return spring 8. Because rotational moment applied to the lock arm by gear 3 in the lock-actuated condition is small, as described before, a tight engagement between the cam surface 5a and cam projection 4a is not caused so that the lock-releasing operation referred to above can be carried out with ease.

As shown in FIGS. 2 and 4, gear 3 is fashioned to a helical gear. Helical shaping of this gear is not illustrated in FIG. 1 for the purpose of an easier perceiving of the analysis shown. As best seen from FIG. 4, each of the first and second locking pawls 6F and 6R is shaped such that it extends substantially parallel with the teeth of gear 3 as viewed in the axial direction of the gear. A helical gear in a power transmission path will depress generation of noise at a high load and/or high rotational speed condition.

In FIG. 3, numerals 51 an 52 designate respectively shifter forks for shifting the shift gear 26 and clutch member 28 of the auxiliary speed change mechanism 13 shown in FIG. 2. These shifter forks are carried by fork-carrying shafts 53 and 54. A control shaft 55 which is given selectively a sliding displacement and also a rotational displacement by an auxiliary change lever (not shown) has a shifter pin 56, attached thereto, which is engaged selectively with one of the shifter forks 51, 52 and then is rotated about the shaft 55 so as to slidingly displace the fork 51, 52.

According to the present invention, a park lock mechanism may include a gear having a relatively large pressure angle, such as a transmission gear, without causing any trouble. By employing a transmission gear for the park lock purpose, the vehicle park lock mechanism according to the present invention may be installed in a tractor or the like in a space-saving manner.

While the above description constitutes the preferred embodiment of the present invention, it is to be appreciated that the invention is susceptible to modification, variation and change without departing from the proper scope and fair meaning of the accompanying claims.

I claim:

1. In a vehicle having a park lock mechanism comprising: a gear fixedly mounted on a transmission shaft, which is given selectively a forward directional rotation for providing a forward directional run of the vehicle and a backward directional rotation for providing a backward directional run of the vehicle; and a rotatable lock arm which includes thereon an integral pawl means engageable with said gear and is operated to rotate towards a direction of causing an engagement of said pawl means with said gear, the improvement characterized in:

that said pawl means is comprised of first and second locking pawls (6F, 6R) arranged such that when said lock arm (5) is rotationally displaced towards said gear (3) said first and second pawls project into two tooth spaces (3b) of said gear which are spaced from each other circumferentially of said gear with at least one tooth space therebetween, said first locking pawl being operable to engage a tooth surface of said gear so as to prevent said forward directional rotation of said gear, and said second locking pawl being operable to engage a tooth surface of said gear so as to prevent said backward directional rotation of said gear; and that said lock arm (5) is shaped such that crests of said first and second locking pawls (6F, 6R) are positioned on the addendum circle (C) of said gear (3) at a same time.

2. In a vehicle having a park lock mechanism comprising: a helical gear having a helix tooth angle with respect to the normal center axis of the gear and being fixedly mounted on a transmission shaft, which is given selectively a forward directional rotation for providing a forward directional run of the vehicle and a backward directional rotation for providing a backward directional run of the vehicle; and a rotatable lock arm which includes thereon an integral pawl means engageable with said gear and is operated to rotate towards a direction of causing an engagement of said pawl means with said gear, the improvement characterized in:

that said pawl means is comprised of first and second locking pawls (6F, 6R) arranged such that when said lock arm (5) is rotationally displaced toward said gear (3) said first and second pawls project into two tooth spaces (3b) of said gear which are spaced from each other circumferentially of said gear with at least one tooth spaced therebetween, said first locking pawl being operable to engage a tooth surface of said gear, and said second locking pawl being operable to engage a tooth surface of said gear so as to prevent said backward directional rotation of said gear, each of said first and second locking pawls (6F, 6R) having a helix angle substantially same as said helix angle of said gear with respect to said normal center axis of the gear.

* * * * *